B. E. MAXWELL.
TIRE SKIVER.
APPLICATION FILED NOV. 11, 1916.
1,236,963.
Patented Aug. 14, 1917.
2 SHEETS—SHEET 1.
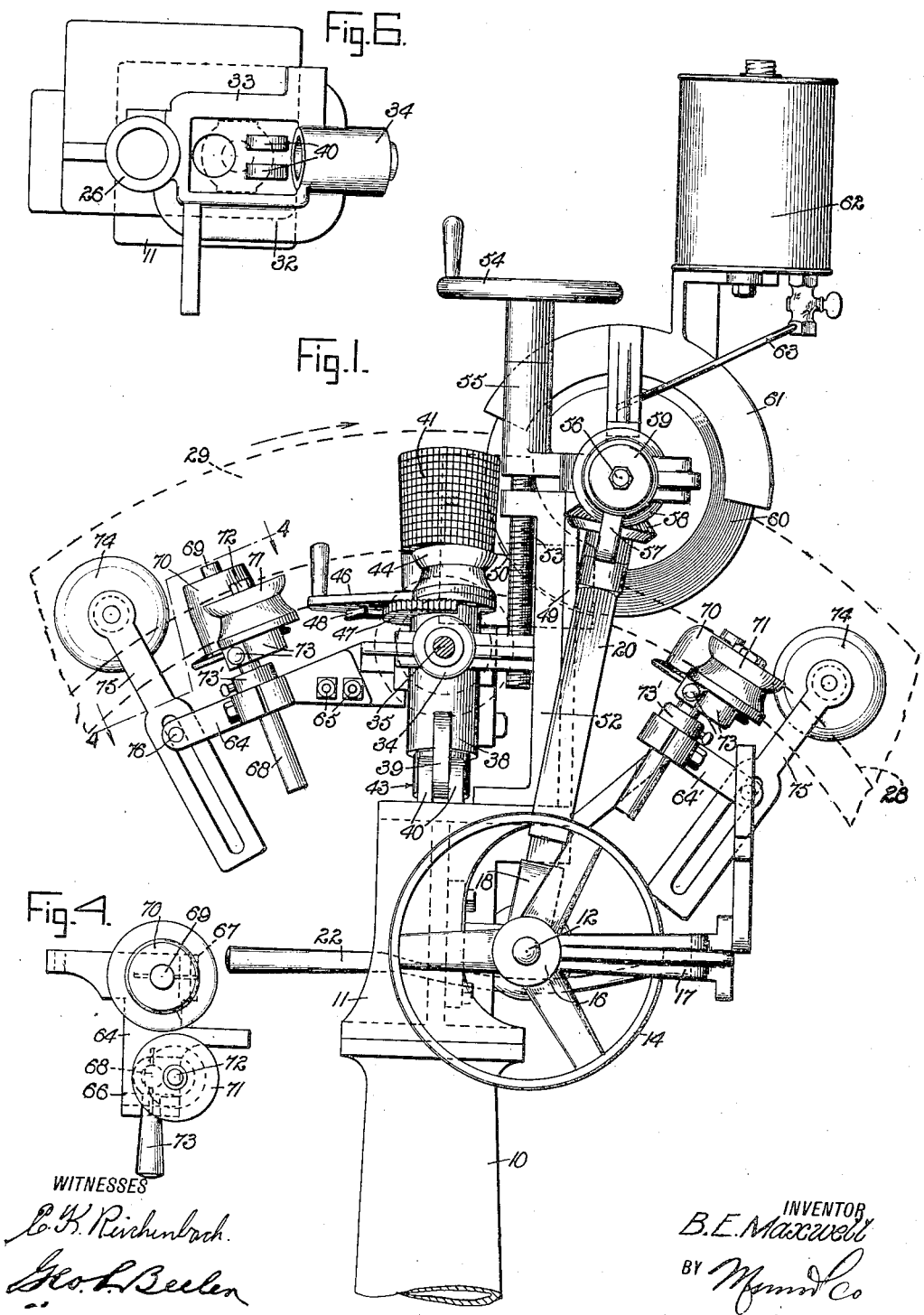
WITNESSES
INVENTOR
B. E. Maxwell
BY
ATTORNEYS

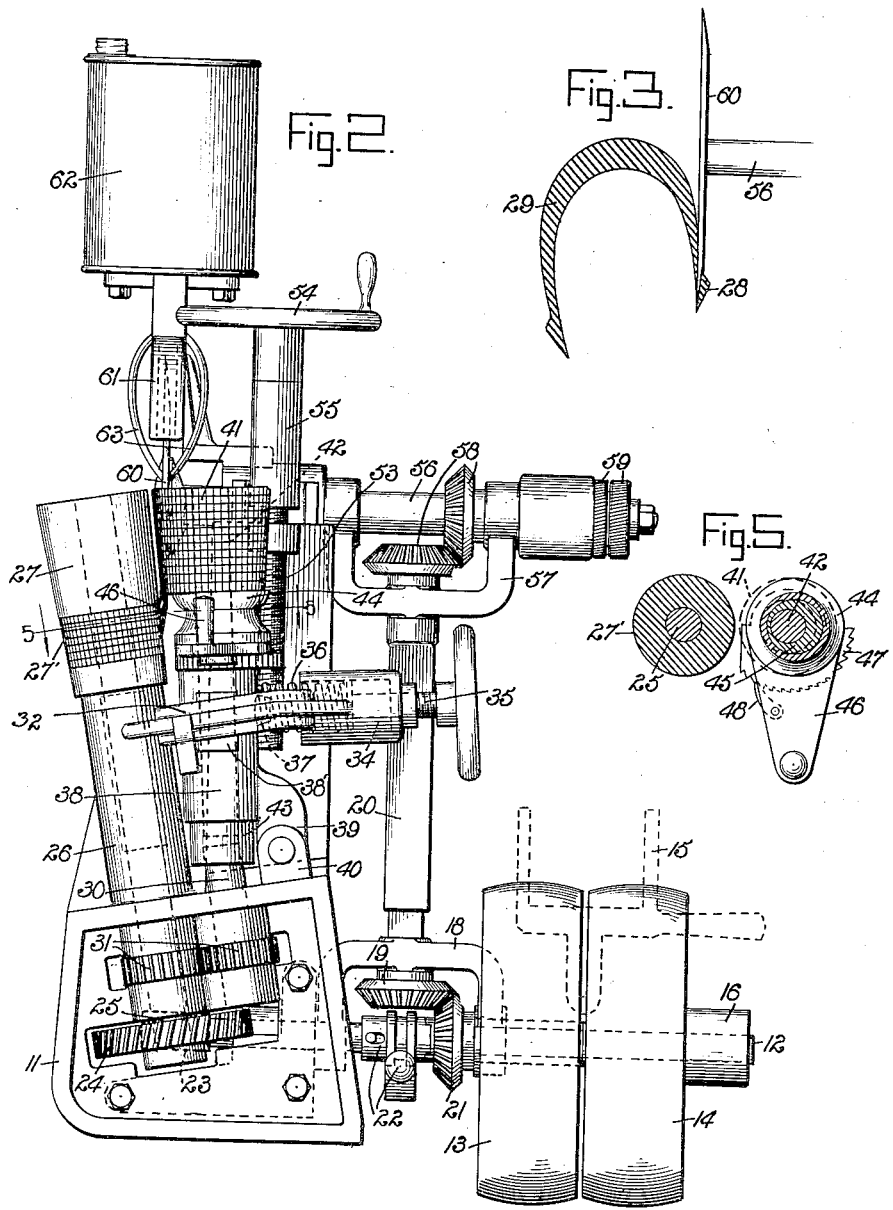

UNITED STATES PATENT OFFICE.

BERT EARL MAXWELL, OF WICHITA, KANSAS.

TIRE-SKIVER.

1,236,963.     Specification of Letters Patent.     Patented Aug. 14, 1917.

Application filed November 11, 1916. Serial No. 130,744.

*To all whom it may concern:*

Be it known that I, BERT EARL MAXWELL, a citizen of the United States, and a resident of Wichita, in the county of Sedgwick and State of Kansas, have invented a new and Improved Tire-Skiver, of which the following is a full, clear, and exact description.

This invention relates to cutting or trimming machines and has particular reference to a machine adapted especially for trimming or skiving off the beads from tires or shoes such as are commonly used on automobiles, motorcycles and other vehicles.

Among the objects of the invention is to provide a machine including a pair of feed rollers for controlling the position or movement of the tire, a rotary knife or cutter for acting upon the tire while being controlled by the rollers, and gear devices for operating the knife at a certain speed or in a certain definite relation to the rollers.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of the main portions of my improved machine, dotted lines being used to indicate approximately the position of a tire being operated upon;

Fig. 2 is an upright view as will be seen looking toward the left in Fig. 1;

Fig. 3 is a detail view indicating the relation of the knife to the tire being skived;

Fig. 4 is a detail view looking down upon one of the side guiding devices;

Fig. 5 is a horizontal sectional detail approximately on the line 5—5 of Fig. 2; and Fig. 6 is a detail view indicating the top of the main rigid frame.

Referring now more particularly to the drawings, I show at 10 a support or pedestal adapted to be secured in fixed position as upon the floor of a shop or factory by any suitable means. The main frame 11 is secured as a head upon the upper end of the pedestal and in or to this frame are secured or carried all of the parts of my improved mechanism. A power shaft 12 is journaled in this frame 11 and carries fixed and loose pulleys 13 and 14, over which a belt is adapted to operate under the control of a shifter 15. This power device represents any suitable means for rotating the shaft either by hand or by machinery. One of the bearings 16 for the shaft 12 is carried by an arm 17 of the frame. This arm serves as a guard for the belt (not shown). Between the tight pulley 13 and the main portion of the frame 11 is hung a yoke 18 in which is journaled a miter gear 19 secured to the lower end of a telescopic shaft 20. This miter gear meshes with a similar gear 21 journaled loosely upon the shaft 12, but which is adapted to be locked thereto by any suitable form of shifting clutch indicated at 22.

The inner end of the shaft 12 carries a worm 23 which drives either directly or indirectly a worm wheel 24 secured to the lower end of a shaft 25 journaled in a hub 26 constituting a part of the fixed frame and having the axis of said shaft inclined slightly from the vertical, see Fig. 2. A frusto-conical gripping and driving roller 27 operates directly from the driving shaft and always around a fixed axis. This roller is knurled along its active gripping portion at 27' just opposite the bead 28 being skived from the tire 29. The main body or tread portion of the tire in the operation of the machine embraces the upper end of the roller 27.

A short jack shaft 30 is journaled in the main frame 11 close and parallel to the lower end of the shaft 25 and is driven therefrom by means of spur gears 31 secured to the respective shafts.

Referring now more particularly to Fig. 6, I show the upper portion of the main frame comprising a pair of spaced rigid arms 32 and 33 extending laterally from the upper end of the hub 26 and carrying a socket piece 34, into which a hand-operated screw 35 is tapped. The inner end of the screw 35 bears upon a strong coil spring 36 whose opposite end embraces a lug 37 secured upon a rocker sleeve 38. This sleeve has a downward extension 39 pivoted between a pair of ears 40 extending upwardly from the main portion of the frame 11.

A second frusto-conical tire gripping roller is indicated at 41, which coöperates directly with the roller 27, but on the outside of the tire therefrom. This latter roller is preferably knurled throughout its entire curved surface. This roller is secured to a shaft 42 which in turn is journaled in the rocker sleeve 38 and connected by means of a universal joint to the jack shaft 30. When the hand screw 35 is operated toward the spring, the force of the spring acting upon the rocker sleeve carries the roller 41 forcibly toward the primary driving roller 27, the resiliency of the spring determining the degree of gripping contact between the rollers and the tire. The hand screw 35 is adjusted outwardly to admit the tire over the primary roller, bringing the bead 28 thereof beneath the secondary roller 41, where it may be gripped between the knurled portion 27′ of the primary roller and a bead roller 44 journaled upon an eccentric 45 having a lever 46 extending therefrom adjacent to the upper end of the rocker sleeve 38, the eccentric itself being journaled upon the shaft 42. The rocker sleeve 38 carries a curved rack 47 with which a pawl carried by the lever 46 coöperates when the lever is swung toward the right as in Fig. 2, causing the larger radius of the eccentric to throw the bead roller 44 toward the knurled portion 27′ of the primary roller. The rocker sleeve 38 is prevented from turning or twisting around a vertical axis, incident to this operation of the lever or otherwise, by direct contact between the flat faces 38′ thereof and the arms 32 and 33 above described.

A substantially vertical guide plate or table 49 is secured to the main frame just in the rear of the primary roller 27 and approximately in a plane parallel to the axis thereof. Said table is provided with a shallow arc-shaped recess 50 and is concaved to provide close communication with the primary roller.

52 indicates an upright constituting an upward extension of the main frame and having a hand screw 53 tapped vertically through its upper end. This screw carries a hand wheel 54 at its upper end which is swiveled in a vertically adjustable frame 55, and in this frame is journaled a knife shaft 56. A yoke 57 is hung upon this shaft 56 and in the bend of this yoke is journaled the upper end of the telescopic shaft 20. Miter gears 58 secured to the shafts 20 and 56 serve to cause the rotation of the shaft 56 from the telescopic shaft. This shaft 56 is adjustable endwise by means of knurled nuts 59 and to the opposite end of the shaft is secured the disk-shaped cutter or knife 60, whose cutting edge operates in the recess 50 above referred to. The screw 53 holds the cutting device in any position to which it may be set by such screw. Upon elevation of the screw, however, the knife is raised free from the tire or away from the location of the tire when the tire is on the machine. The shaft 20 being telescopic accommodates itself in length to this adjustment of the cutter and the yokes 18 and 57 likewise accommodate themselves to the slight variation in angle assumed by the shaft 20 incident to such adjustment.

A knife guard 61 is carried by the frame extension 55 and surrounds the exposed portion of the knife. A receptacle 62 is carried by the guard 61 and serves to supply fluid through tubes 63 to the knife for the purpose of facilitating the operation of cutting or skiving a tire.

With the tire to be treated disposed in a substantially vertical plane and occupying the position indicated in Fig. 1, with respect to the primary and secondary actuating rollers 27 and 41, it follows that some suitable supporting and gripping means are needed on opposite sides of said rollers to provide for suitable automatic actuation of the tire as a whole while the bead is being skived therefrom. Fig. 4 is relied upon particularly in connection with Fig. 1, said guiding and supporting means being omitted from Fig. 2, to show a preferred construction for such purpose. 64 indicates a bracket rigidly attached to the main frame as by means of bolts 65. This bracket is provided with gripping sockets 66 and 67 in which are fitted spindles 68 and 69 respectively. An inside roller 70 is journaled upon the spindle 69 and an outside bead-gripping roller 71 is journaled upon a stud 72 secured to a bell crank lever 73 carried by the upper end of the spindle 68 and adapted to be adjusted around the axis of the spindle 68, so as to throw the roller 71 toward or away from the outer surface of the bead running between the rollers 70 and 71. The elevation of these spindles and rollers may be determined by any suitable means, as by adjustable collars 73′.

A supporting roller 74 is mounted upon an endwise and laterally adjustable arm 75 connected by a pin or bolt 76 to the outer end of the bracket 64. On the opposite side of the primary and secondary rollers are other guiding and supporting devices substantially the same as those just described in detail and all mounted upon a bracket 64′.

The operation of this machine may be briefly summarized as follows: With the supporting rollers 74 and guiding rollers 70 and 71 adjusted according to the size or type of tire to be treated, the tire will be put into operative position by throwing the bell cranks 73 around the axes of the spindles 68, so as to throw the rollers 71 away from the inside rollers 70. The auxiliary frame 55 with the cutting mechanism carried thereby will be hoisted by operation of the screw 53 so as to be well out of the way of the tire. The hand screw 35 will be loosened to permit the rocker frame 38 and parts carried thereby to swing laterally away from the primary roller 27. Then the tire will be put in place over the top of the primary roller and the rollers 70 and 74. The adjustable guiding and gripping rollers will then be swung into place engaging the outer surface of the bead to be skived with a suitable degree of tension, and likewise the roller 44 will be adjusted into close contact with the bead by swinging the lever 46 as already described. The bead of the tire comes beneath the secondary roller 41. Then the cutting mechanism will be adjusted downwardly into active position and the machine will be started to actuate all of the movable parts, the driving means for the cutter being operated at a higher speed than the driving rollers, this being due to the direct gearing through the telescopic shaft 20 and the lower speed driving means for the rollers. The cutting mechanism is adapted to be adjusted up or down or toward or from the bead, as may be desired, while the machine is in operation.

I claim:

1. In a skiving machine, the combination of a main frame having a hub and a pair of parallel arms, a main shaft journaled in the frame hub, a primary roller secured to one end of the shaft, a sleeve mounted between said arms and held thereby from twisting, one end of the sleeve being connected to the frame through a transverse pivot, resilient means acting upon the free end of the sleeve to control its movement toward or from the main shaft around said pivot, a secondary shaft journaled in said sleeve, a secondary roller secured on the secondary shaft adjacent to the primary roller, a rotary cutter adjacent to the rollers, means to operate the main shaft, means to drive the cutter simultaneously with the operation of the main shaft, and means to vary the position of the cutter with respect to the rollers.

2. In a skiving machine, the combination of a main frame, a shaft journaled therein, a primary roller connected to one end of the shaft, a sleeve, means pivotally supporting one end of the sleeve adjacent to the shaft, means acting to force the free end of the sleeve toward the shaft, a secondary shaft journaled in said sleeve, a secondary roller adjacent to the primary roller and secured upon said secondary shaft, means acting upon the free end of the sleeve to determine the position of the secondary roller with respect to the primary roller, a rotary cutter arranged in a plane at a slight inclination to a plane passing between the rollers, means to actuate the cutter, and means to adjust the cutter bodily lengthwise of the rollers.

3. In a machine of the character set forth, the combination of a main frame, a shaft journaled therein, a jack shaft parallel to the shaft aforesaid, a secondary shaft, a universal joint connection between the jack shaft and the secondary shaft, a supporting sleeve in which the secondary shaft is journaled, means to secure the supporting sleeve to the frame providing for adjustment of the sleeve and the secondary shaft, means to drive the jack shaft and the secondary shaft from the primary shaft irrespective of the adjustment of the sleeve, a cutter shaft journaled at an oblique angle to the first mentioned shaft, a rotary cutter secured to the cutter shaft, means to rotate the cutter shaft and cutter, and means secured to the primary and secondary shafts to feed a tire into position to be skived by the cutter.

BERT EARL MAXWELL.